C. W. & O. G. NEWTON.
Cotton Gin.
No. 52,877.
3 Sheets—Sheet 1.
Patented Feb. 27, 1866.
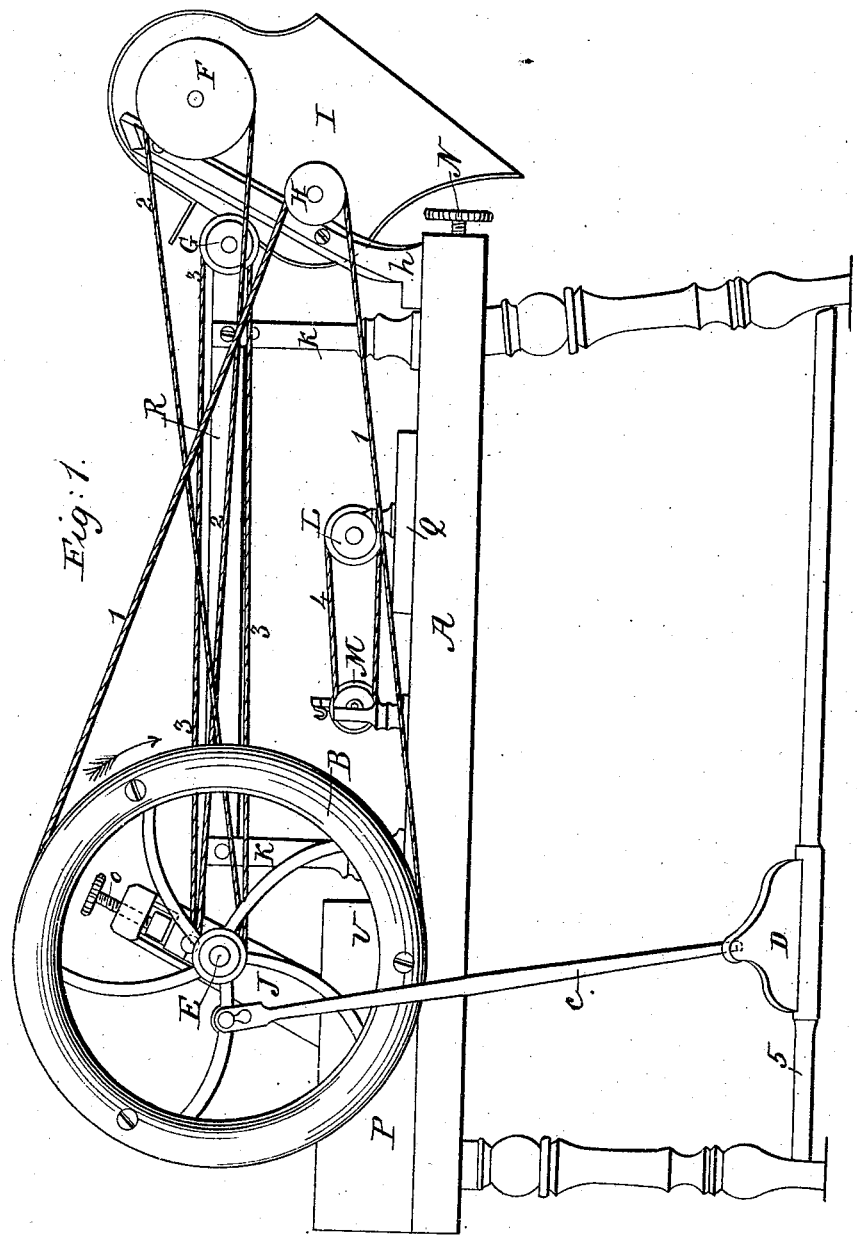

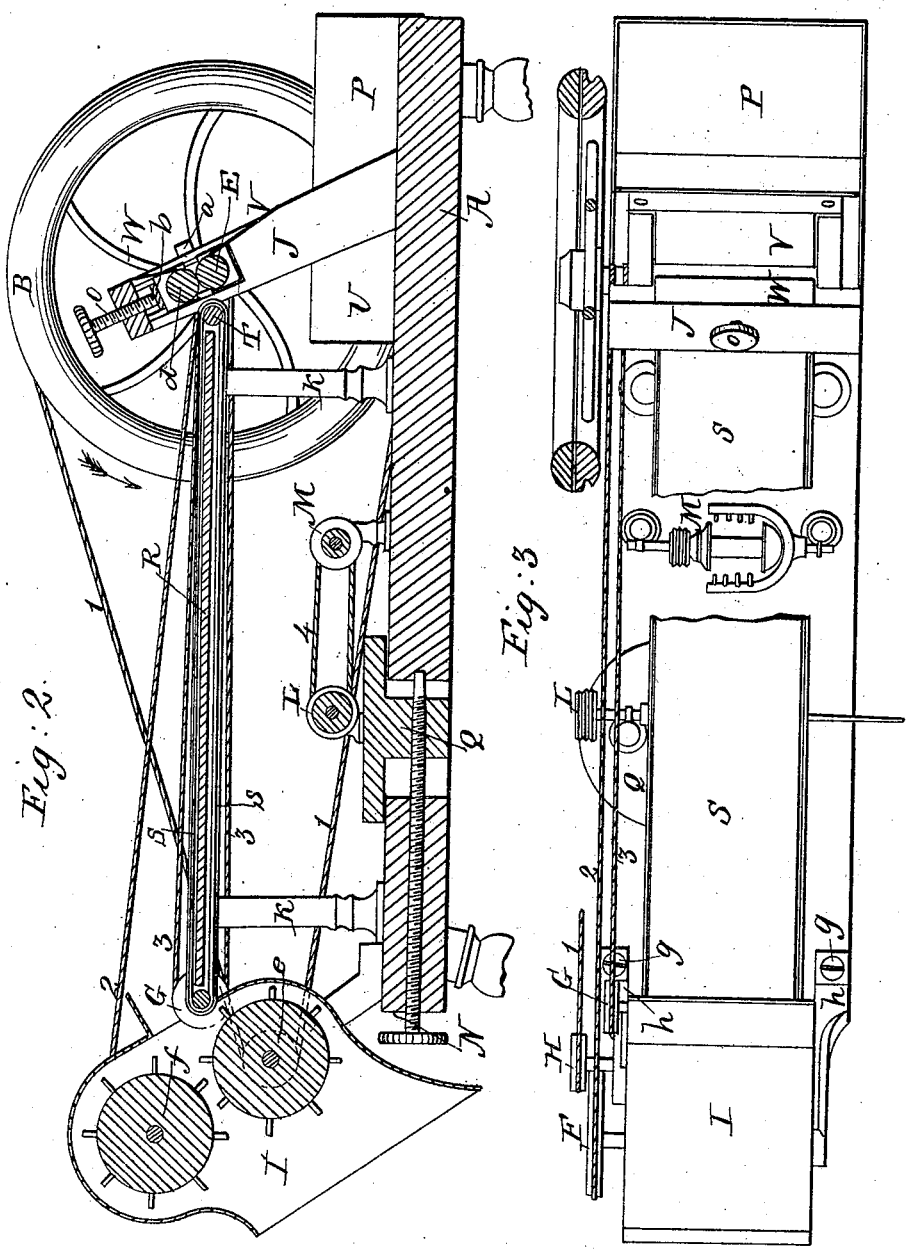

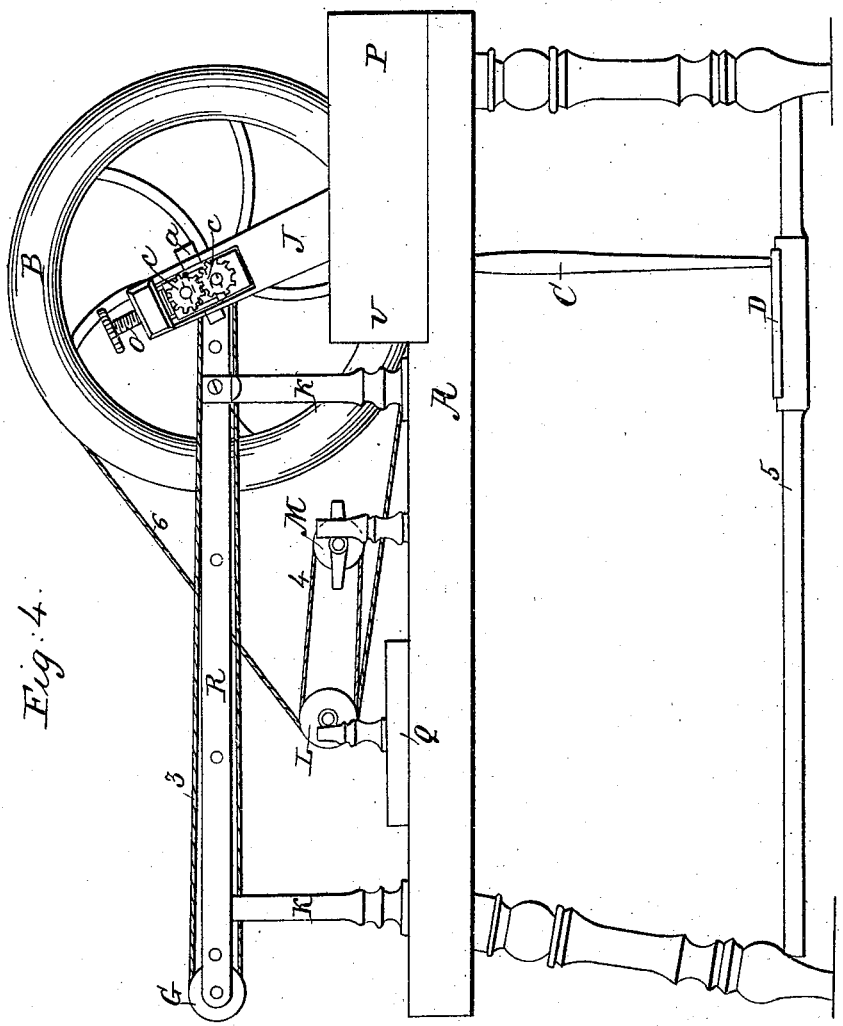

UNITED STATES PATENT OFFICE.

C. W. NEWTON AND O. G. NEWTON, OF EDINBURG, MISSOURI.

IMPROVEMENT IN TREATING FLAX, COTTON, &c.

Specification forming part of Letters Patent No. 52,877, dated February 27, 1866.

*To all whom it may concern:*

Be it known that we, C. W. NEWTON and O. G. NEWTON, of Edinburg, in the county of Grundy and State of Missouri, have invented a new and useful Improvement in Machines for Treating and Spinning Cotton and other Fibrous Substances; and we do hereby declare that the following is a full, clear, and exact description thereof, which will enable others skilled in the art to make and use the same, reference being had to the accompanying drawings, forming part of this specification, in which—

Figure 1, Sheet No. 1, is a side view of the machine constructed according to our invention, seen from the side opposite to that from which it is operated. Fig. 2, Sheet No. 2, is an elevation of a longitudinal section of the upper part of the machine. Fig. 3, Sheet No. 2, is a plan. Fig. 4, Sheet No. 3, is another side view of the machine.

Similar letters of reference indicate like parts.

The object of this invention is to produce a machine for family use which will enable families in remote districts, as in Missouri, Arkansas, and also in retired parts of less remote districts, to manufacture cotton and other fibrous substances of their own raising. Many families in these districts raise small crops of cotton—from fifty pounds upward—and they have great need of a portable and cheaply-built machine for working them up at home.

The invention consists in combining several well-known appliances for cleaning and working cotton, wool, and other fibrous substances in such a way and by means of such devices as to produce a family machine which can be operated without the aid of animal or water or steam power, and which, by means of changes provided for in its construction, can be operated in the treatment and spinning of cotton, wool, flax, and hemp—that is to say, it will pick cotton and wool, gin cotton, and spin wool, flax, hemp, or cotton.

A designates the frame and pedestal which supports the machinery to be described. Its feet are made to support the ends of a rock-shaft, 5, to which a treadle, D, is attached. The treadle is connected by a rod, C, to a crank-pin on a fly-wheel, B, whose shaft E is the lower one of two ginning-rollers which are supported in a frame, J. This frame is inclined toward the left, (see Fig. 4,) in order that the seed of the cotton may have an unobstructed path in its descent after the cotton has been drawn between the rollers, the upper roller, $d$, being made to project over the space which occurs between the lower roller and the adjacent end of the feed-apron. The frame J rises from a box which is divided into an outer compartment, P, which receives the cotton, and an inner compartment, U, which receives the seed and any other substances rejected by the rollers of the gin. The gin-rollers E $d$ have gears $c$ formed on their inner ends, which mesh with each other when the keys $a$ are withdrawn from the frame J. When these keys are in place the upper roller, $d$, is raised thereby, so that its gear $c$ becomes disengaged from the gear $c$ of the lower roller.

The letter $b$ designates a spring-plate whose ends rest on the boxes of the ends of the upper roller, $d$, and a set-screw, O, passing down through the top of the frame J, comes in contact with the said plate at the middle of its length, so as to hold the roller firmly on the keys $a$ when they are inserted, and when they are withdrawn it holds it in its bearings, so that it will mesh with the geared end of the lower roller.

W is a spring-plate extending down from the top of the frame J in front of the upper roller, and V is a like plate extending upward in front of the lower plate. Their edges rest against the said rollers, and their office is to prevent the cotton which passes the gin from becoming wound about the rollers.

The balance-wheel is made in two parts, one of which consists merely of a ring, which is screwed to the other part when it is desired to make the wheel heavy, as when the pickers are running, and which is taken off when it is desired to make it light, as when the machine is to be used for spinning. The fixed part of the wheel has a groove about it to receive a band, 1, which extends to a small pulley, H, fast on the shaft of the lower picking-roller, $e$. This roller and the upper picking-roller, $f$, are inclosed in a hood, I, open on its outer side to discharge the material fed to it, and also open on its inner side, where it receives the material from the feeding-apron S. The axle of the upper picking-roller has a large pulley, F, which is driven by a band, 2, which extends around a groove (not seen) made on the shaft of the fly-wheel. The construction and arrangement here shown of the said pulleys cause the lower picker, e, to run at a high speed and the upper picker, f, to run at a low speed. It will be observed that the upper picker is set to the left of a vertical line passing through the axis of the lower picker, e, looking at Fig. 2.

R designates a table, which extends from the picker-rollers to the ginning-rollers, and is supported upon pillars R.

S is an endless apron passing around rollers G T, one of which is placed at each end of said table. This apron traverses above and below said table from end to end, and serves to feed both the picker and the gin, according to the direction of its motion. A pulley on one end of the roller G serves to drive the apron by frictional contact between it and the periphery of the roller, the pulley being rotated by a band, 3, from the shaft of the fly-wheel.

Q is a sliding platform, made capable of sliding in a longitudinal direction by means of a screw-rod, N, whose head projects from one end of the platform A, beneath the picker-box I. By this means the operator is enabled to tighten the bands of the flier and spindle. The platform supports a flier, L, whose spindle carries a pulley which drives an ordinary spindle, M, by means of a band, 4. The flier itself is driven by means of a band, 6, from the fly-wheel, which band is put on when the band 1, that drives the picker, is laid aside.

The manner of operating this machine is as follows: If the operator desires to use the picker, the bands 1, 2, and 3 are put upon their pulleys, and motion being given to the treadle, the apron S will deliver to the picker whatever cotton or wool is put on it. The fast picker-cylinder e throws the material against the teeth of the slow cylinder, which retards the fibers, and thus enables the teeth of the fast cylinder to give them a thorough picking before they are discharged. We find that cotton can be ginned much faster after having been picked, because the pickers open it and disengage much of the refuse matter. When the gin is to be used the keys a are withdrawn, so that the gears e can become engaged, and the fly-wheel is turned in such direction that the feeding-apron will move toward the gin. Cotton being next placed on the apron, it will be delivered to the ginning-rollers, which will seize and carry the fibers between them and deliver them into the compartment P, while the seed will fall into the part U. When the picker is not in use it is to be removed from the bench, which is done by removing the screws g g, which fasten the feet h h of the picker-box to the bench. This is chiefly desirable to be done when using the spinning apparatus L M.

We claim as new and desire to secure by Letters Patent—

The combination, on the same bench for family use, of a picking apparatus, a ginning apparatus, a feeding-apron, and a spinning apparatus, all driven from the same treadle motion, substantially as described.

C. W. NEWTON.
O. G. NEWTON.

Witnesses:
L. M. ABBOTT,
R. T. HUTTON.